United States Patent [19]

Langhof et al.

[11] Patent Number: 5,224,903
[45] Date of Patent: Jul. 6, 1993

[54] CHAIN WHEEL HAVING A SHRINK RING MADE OF A POLYMER MATERIAL

[75] Inventors: Rolf Langhof, Offenbach; Michael Schütz, Rimbach; Hans-Kurt Kohl, Gorxheimertal, all of Fed. Rep. of Germany

[73] Assignee: Firma Carl Freudenberg, Weinheim/Bergstr., Fed. Rep. of Germany

[21] Appl. No.: 892,780

[22] Filed: Jun. 3, 1992

[30] Foreign Application Priority Data

Jun. 18, 1991 [DE] Fed. Rep. of Germany ........ 4119981

[51] Int. Cl.⁵ .............................................. F16H 55/17
[52] U.S. Cl. .................................... 474/152; 474/161
[58] Field of Search ................ 474/152, 161, 190–192

[56] References Cited

U.S. PATENT DOCUMENTS 4,589,860  5/1986  Brandenstein et al. ......... 474/152 X
4,867,733  9/1989  Yamanoi et al. ................ 474/161

FOREIGN PATENT DOCUMENTS 4069443  3/1992  Japan .................................. 474/161

Primary Examiner—Thuy M. Bui
Attorney, Agent, or Firm—Kenyon & Kenyon

[57] ABSTRACT

A chain wheel having a basic element with a cylindrical outside surface and a chain pinion which projects beyond the outside surface in the radial direction. At least one shrink ring made of a polymer material is thermally shrunk onto the cylindrical outside surface of the basic element. The polymer material may consist of a block polymer which contains a polyolefin and an elastomer material.

12 Claims, 6 Drawing Sheets

CHAIN WHEEL HAVING A SHRINK RING MADE OF A POLYMER MATERIAL

BACKGROUND OF THE INVENTION

The present invention relates to a chain wheel having a basic element with a cylindrical outside surface and a chain pinion which projects beyond the outside surface in the radial direction.

A chain wheel is generally known and is used, for example, in the drive of overhead cam shafts in internal combustion engines. An overhead cam shaft with a chain wheel flanged onto it is connected, via at least one chain, with another chain wheel, which is attached directly to the crank shaft. The chains and the chain wheels run in the crank casing and are lubricated with oil by means of spray nozzles. Chain wheels may also be used in a plurality of gear mechanisms, for example. In previously known embodiments, however, the significant development of noise during use for the intended purpose, especially in connection with chain wheels which rotate at relatively high speeds, such as those to drive cam shafts, is disadvantageous. This disadvantage is often intended to be compensated for using toothed belt drives. However, toothed belt drives used for long periods of time do not always provide very satisfactory properties of use.

SUMMARY OF THE INVENTION

The present invention relates to a chain wheel of the type mentioned above which obtains optimum use properties when used over a long period of time, allowing optimum operating behavior with significantly reduced noise development.

In a chain wheel according to the present invention, at least one shrink ring made of a polymer material is thermally shrunk onto the outside surface. In this connection, it is advantageous that the links of the chain placed around the chain wheel have metallic contact only in the region of the trough-shaped chain pinions. The outside stays, which are arranged perpendicular to the cross-stays, and surround the teeth of the chain pinion on the outside in the axial direction, touch the polymer material which is thermally shrunk onto the outside surface of the basic element, as the stress on the chain increases. In this way, the cross-stays of the chain are gradually pulled into the trough-shaped depression of the chain pinion, in damped form, which results in a significant reduction of the noise development during use for the intended purpose, with excellent use properties over a long useful lifetime.

The polymer material can consist of a block polymer which contains a polyolefin and an elastomer material. Such a material is particularly well suited for the production of shrink rings. The shrink rings demonstrate great expandability in the radial direction, are passed over the basic element in an axial direction for assembly, and then attached to it by being heated. The shrink ring is very durable, since the stress occurs essentially in a radial direction, in other words due to pressure.

In addition, the shrink ring and the cylindrical outside surface can be adhesively connected. This results in additional security to prevent movements of the shrink ring on the cylindrical outside surface of the basic element, both in the axial direction and in the circumferential direction. The shrink ring can be glued to the outside surface, for example, which results in significantly more economic production in comparison with damping rings which are vulcanized onto the outside surface of the basic element.

BRIEF DESCRIPTION OF THE DRAWINGS

Other features and advantages of the present invention will become apparent in view of the following description taken in conjunction with the attached drawings, wherein.

DETAILED DESCRIPTION

Figure 1:
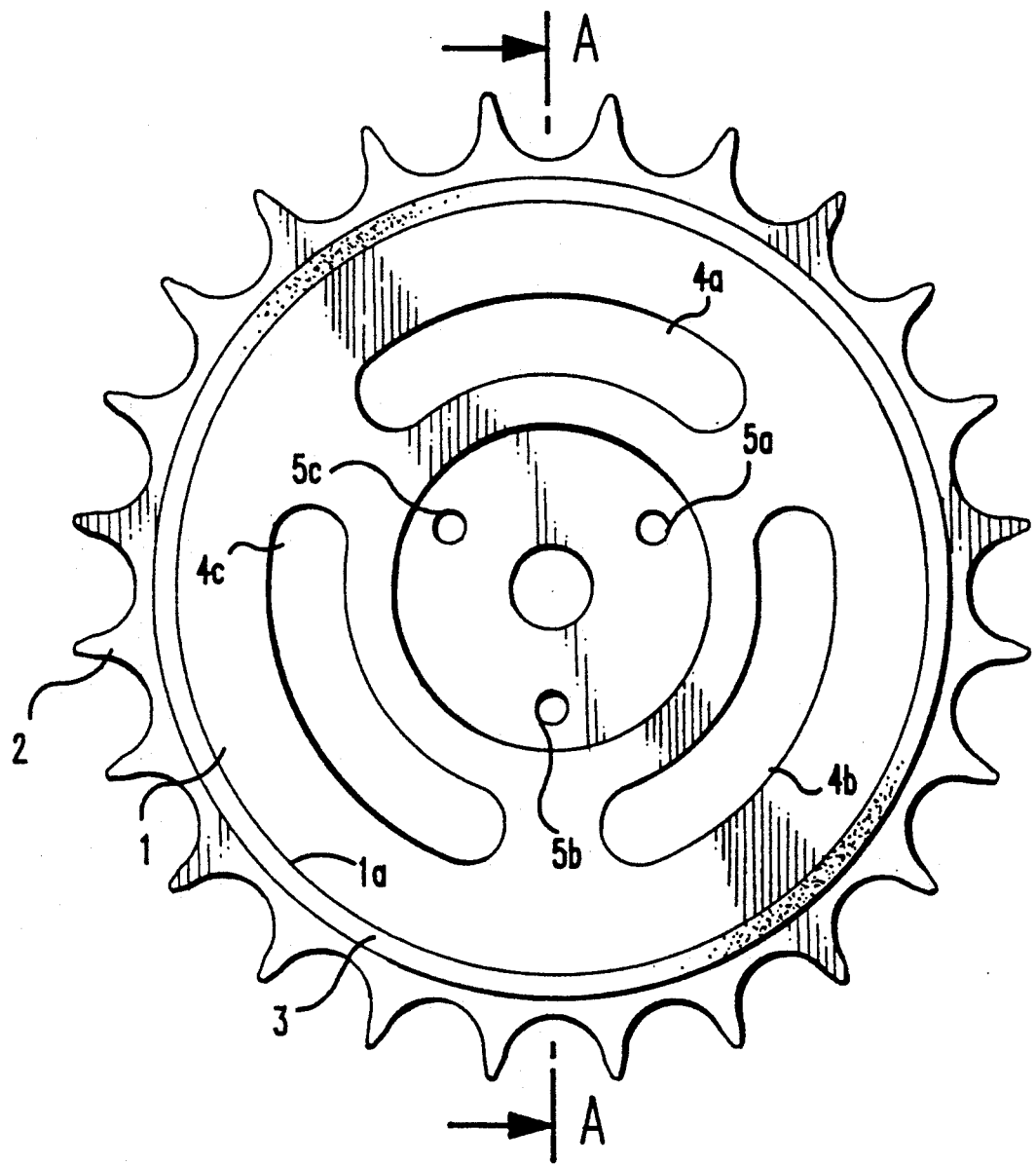
FIG. 1 illustrates a chain wheel from a side view according to an embodiment of the present invention.
Figure 2:
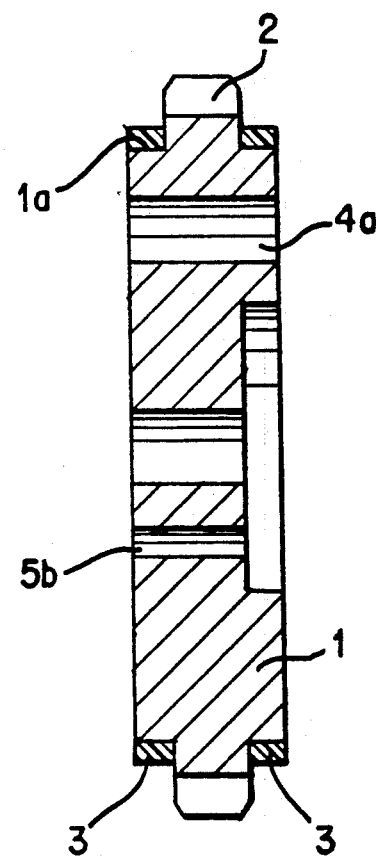
FIG. 2 illustrates the chain wheel of FIG. 1 viewed along the section line A—A of FIG. 1.

In FIGS. 1 and 2, a chain wheel, Which consists of a basic element 1, is shown. The basic element 1 has cylindrical outside surfaces 1a, where a chain pinion 2 projects beyond the outside surfaces 1a in the radial direction. A shrink ring 3 made of polymer material is arranged on the outside surfaces 1a in each case. The polymer material may consist of a block polymer which contains a polyolefin and an elastomer material. The shrink rings 3 are connected with the outside surfaces 1a in a friction lock, by being heated. In addition, the shrink rings 3 may be connected with the cylindrical outside surfaces 1a by adhesion.

To reduce the mass, the chain wheel can have clearances 4a, 4b and 4c which are uniformly distributed in the circumferential direction, for example. Furthermore, the chain wheel can have several anti-twist locks 5a, 5b and 5c, for example, in the form of a keyway and several locking bores, which allow the wheel to be affixed to a shaft such as a cam shaft, not shown here, so that the wheel and shaft do not rotate relative to one another.

The above-described structure is used merely as an example. That is, other friction-lock connections between the chain wheel and a shaft can be made by means of polygon profiles, V-shaped shafts or other friction-lock or positive lock connections, for example.

Figure 3A:
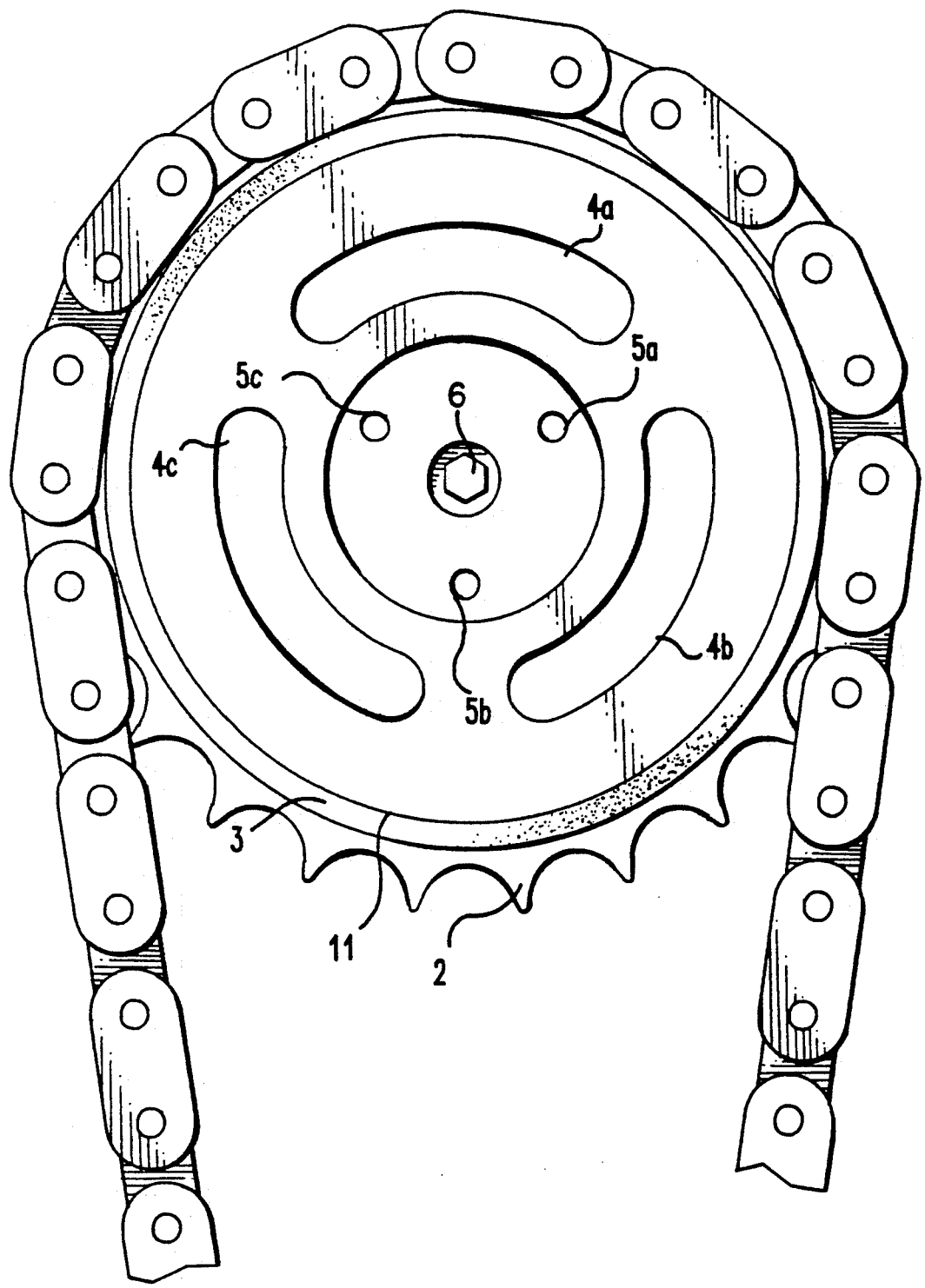
FIG. 3(a) illustrates the chain wheel of FIGS. 1 and 2, flanged onto a shaft and holding a control chain
Figure 3B:
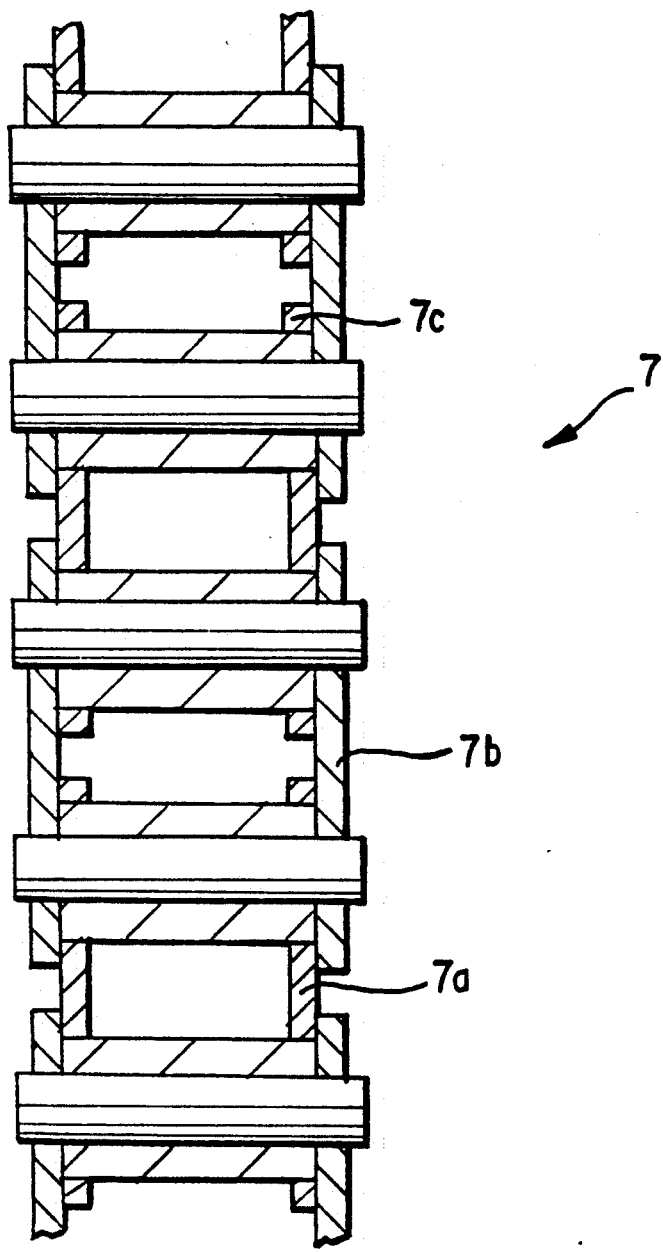
FIG. 3(b) illustrates a control chain, shown schematically.

In FIG. 3(a), the chain wheel described above is shown, for example flanged onto a shaft, not shown here, by means of an anti-twist lock and a screw 6. The anti-twist locks 5a, 5b and 5c fix the chain in place relative to its adjacent shaft. The chain 7, which is shown schematically in FIG. 3(b), can be structured as a sleeve chain or a roller chain. Double and multiple versions of chain pinions with a chain placed on them are also possible here. An advantage of the chain wheel of the present invention is that noises during use for the intended purpose are significantly reduced. With the shrink ring of polymer material, which is thermally shrunk onto the outside surface of the basic element, the chain gradually comes into contact with the trough-shaped recesses of the chain pinion, damped by the polymer material. The inner and outer chain connection elements 7a and 7b rest on the shrink ring 3 made of a polymer material, which causes a clear reduction in the noise development during use for the intended purpose.

In the example illustrated herein, the basic element 1 having outside surfaces 1a and the chain pinion 2 are formed in one piece. A two-piece structure of the basic element and the chain pinion is also possible, however, where the chain pinion can be shrunk onto the basic element, for example. The two-part structure demonstrates the same advantageous properties as the previously mentioned embodiments. Several chain pinions arranged next to one another on one basic element in the axial direction also demonstrates the advantageous properties of the chain wheel according to the present invention when a shrink ring is shrunk on the outside surfaces 1a of the basic element 1.

Figure 4:
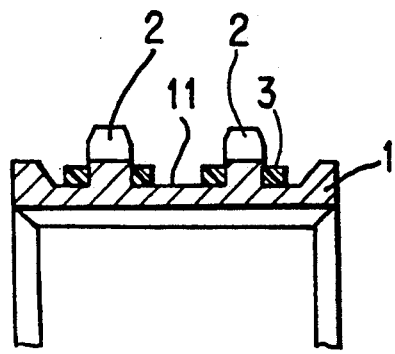
Figure 5:
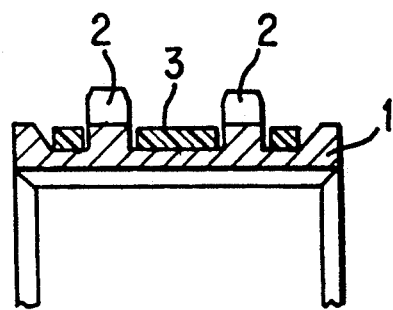

In FIGS. 4 to 8, additional embodiments of the present invention are illustrated. The examples differ in the number of chain pinions 2 which are adjacent to one another in the axial direction, and the application of the shrink rings 3 to the outside surfaces 1a of the basic element 1. In FIGS. 4 and 5, the shrink rings 3 are affixed on an essentially flat outside surface 1a of the basic element 1.

Figure 8:
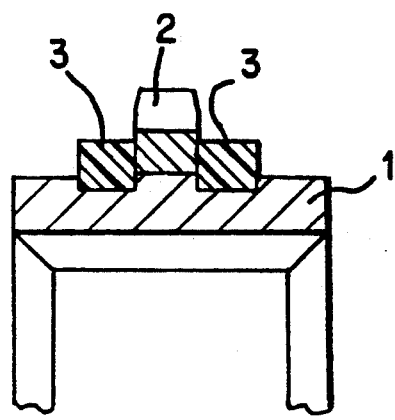
FIGS. 4 to 8 illustrate chain wheels shown in longitudinal cross-section according to additional embodiments of the present invention.
Figure 6:
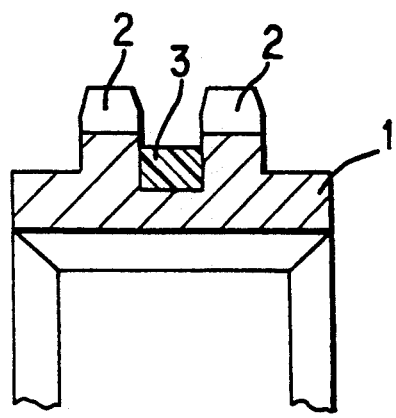
Figure 7:
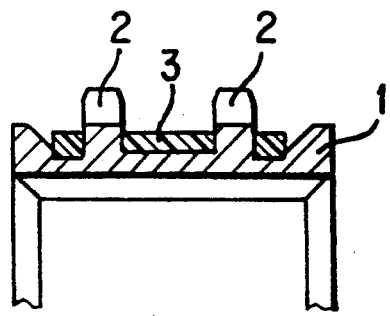

In FIGS. 6 and 7, the shrink rings 3 are arranged in recesses of the basic element 1. This arrangement guarantees additional security against shifting of the shrink rings 3 in an axial direction. A particularly uncomplicated and economically advantageous variation of the chain pinion according to the present invention is illustrated in FIG. 6. A shrink ring 3 of polymer material is arranged only between the two chain pinions 2. The advantages of the present invention also occur using this structure. In FIG. 8, the chain pinion 2 is shrunk onto the basic element 1. To fix the shrink rings 3 of polymer material in place in the axial direction, recesses are arranged in the basic element 1. This embodiment also demonstrates the advantageous properties of the present invention.

What is claimed is:

1. A chain wheel, comprising:
   a basic element having a cylindrical outside surface;
   a chain pinion which projects beyond the outside surface in the radial direction; and
   a shrink ring made of a polymer material thermally shrunk onto the cylindrical outside surface.

2. The chain wheel according to claim 1, wherein the polymer material consists of a block polymer which contains a polyolefin and an elastomer material.

3. The chain wheel according to claim 1, wherein the shrink ring and the cylindrical outside surface are adhesively connected.

4. The chain wheel according to claim 2, wherein the shrink ring and the cylindrical outside surface are adhesively connected.

5. The chain wheel according to claim 1, wherein the shrink ring and the cylindrical outside surface are connected in a friction lock by being heated.

6. The chain wheel according to claim 1, wherein the basic element and the chain pinion are formed in one piece.

7. The chain wheel according to claim 1, wherein the chain pinion is shrunk onto the basic element.

8. The chain wheel according to claim 1, wherein the shrink ring is arranged in recesses of the basic element.

9. The chain wheel according to claim 1, wherein the shrink ring is arranged between one or more chain pinions.

10. The chain wheel according to claim 1, wherein the chain wheel is located in a drive of an overhead cam shaft in an internal combustion engine.

11. The chain wheel according to claim 1, wherein the chain wheel rotates at a high speed.

12. The chain wheel according to claim 1, wherein the chain wheel is attached to a crank shaft.

* * * * *